United States Patent [19]

Conrad

[11] 4,449,958
[45] May 22, 1984

[54] POSITIVE TRACKING PULLEY AND BELT CONSTRUCTION

[76] Inventor: Rene A. Conrad, 215 Olive Hill La., Woodside, Calif. 94062

[21] Appl. No.: 305,288

[22] Filed: Sep. 24, 1981

[51] Int. Cl.³ .......................... F16G 1/28; F16H 7/02; B65G 23/06
[52] U.S. Cl. .................................. 474/205; 474/167; 198/834
[58] Field of Search .............. 474/152, 153, 139, 167, 474/204, 205; 198/834, 835, 840, 868

[56] References Cited

U.S. PATENT DOCUMENTS

| | | | |
|---|---|---|---|
| 1,534,460 | 4/1925 | Nelson | 474/167 |
| 3,430,506 | 3/1969 | Stone | 198/835 |
| 3,722,962 | 3/1973 | Cooper | 474/153 |
| 3,854,272 | 12/1974 | Lane et al. | 474/153 |
| 3,987,683 | 10/1976 | Singh | 474/167 |
| 4,011,939 | 3/1977 | Conrad | 198/840 |
| 4,072,062 | 2/1978 | Morling et al. | 474/153 |
| 4,290,761 | 9/1981 | Suginaka | 198/835 |

FOREIGN PATENT DOCUMENTS

| | | | |
|---|---|---|---|
| 1070189 | 1/1953 | France | 474/204 |
| 1069964 | 1/1953 | France | 474/204 |
| 1125649 | 7/1956 | France | 474/152 |
| 1343123 | 11/1962 | France | 474/204 |
| 772330 | 4/1957 | United Kingdom | 474/152 |

*Primary Examiner*—John E. Murtagh
*Assistant Examiner*—Andrew Joseph Rudy
*Attorney, Agent, or Firm*—Hamrick, Hoffman, Guillot & Kazubowski

[57] ABSTRACT

An endless belt apparatus (10) which can be used in either a timing, driving, and/or load carrying system, has a generally cylindrical drive pulley (12) in the outer surface (22) of which is provided recesses for engaging with an associated belt (26) including a planar web (28) provided with projections (34, 34') arranged in a symmetrical matrix for positively engaging with the recesses of the pulley for tracking and/or advancing the belt. Similar recesses provided in the other pulleys of the system will permit the belt to rotate such pulleys as a function of the rotation of the drive pulley. Circumferential grooves either recessed (24) or formed by annular rings (82) can be provided on the pulley for tracking purposes and axial channels (64) or sprocket teeth (90) for drive purposes, although it is contemplated that a symmetrical matrix of recesses (74) be provided on the pulley for matingly receiving the matrix of projections (34, 34') and permitting both training and advancing, in either direction, of the belt (26) simultaneously.

1 Claim, 13 Drawing Figures

U.S. Patent May 22, 1984 Sheet 1 of 2 4,449,958
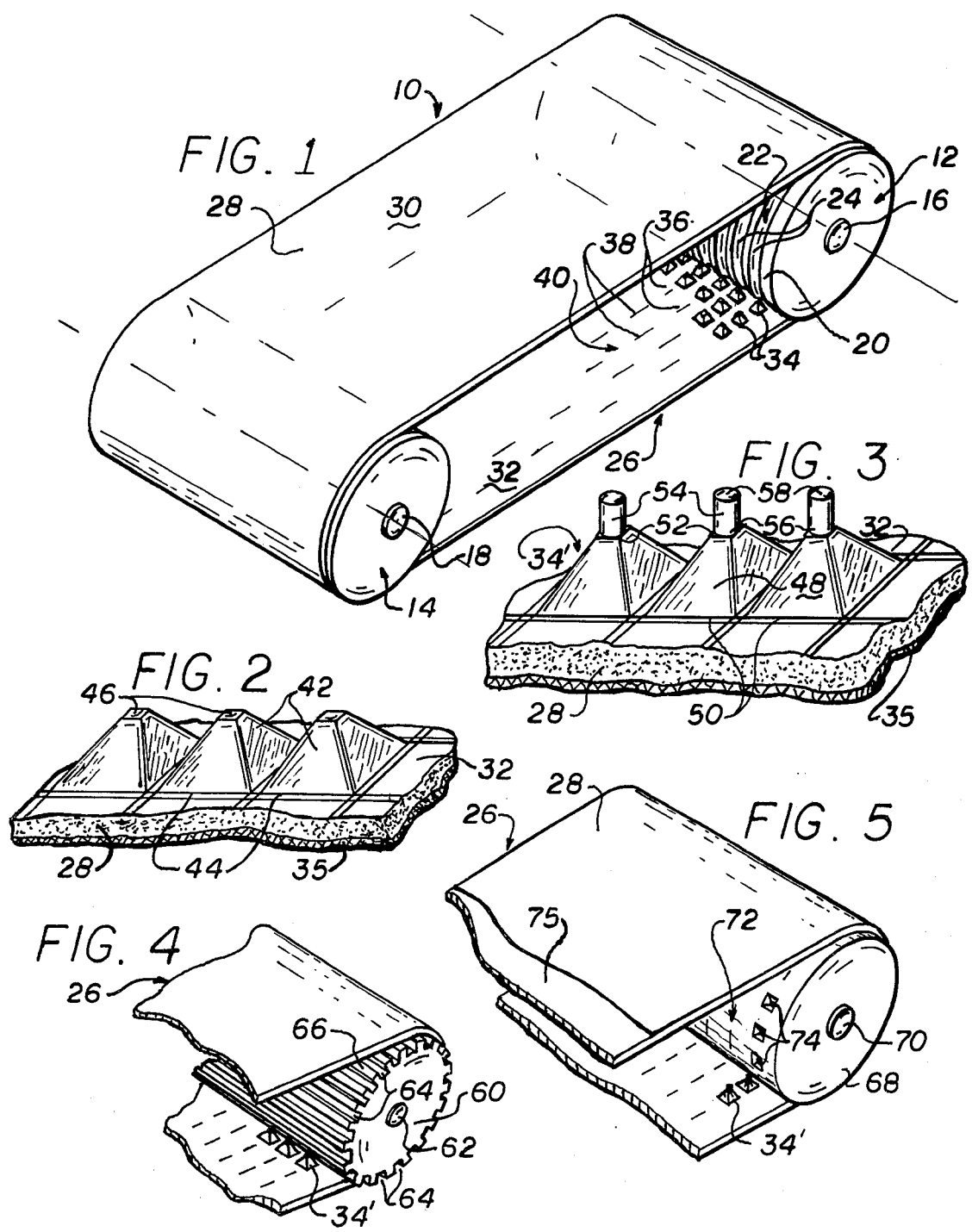

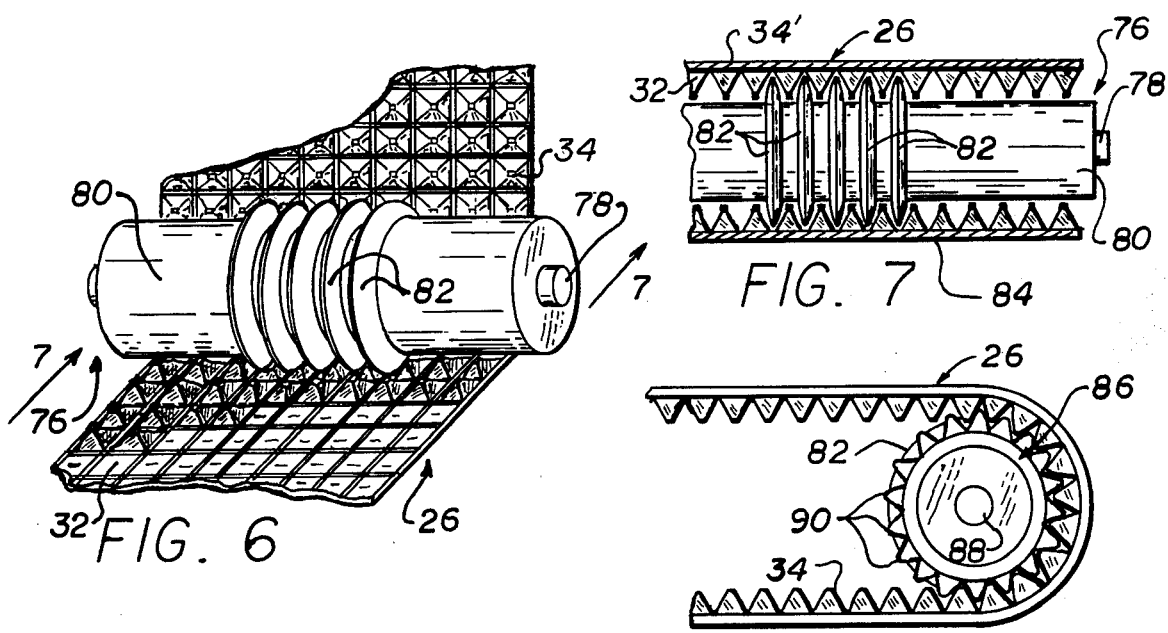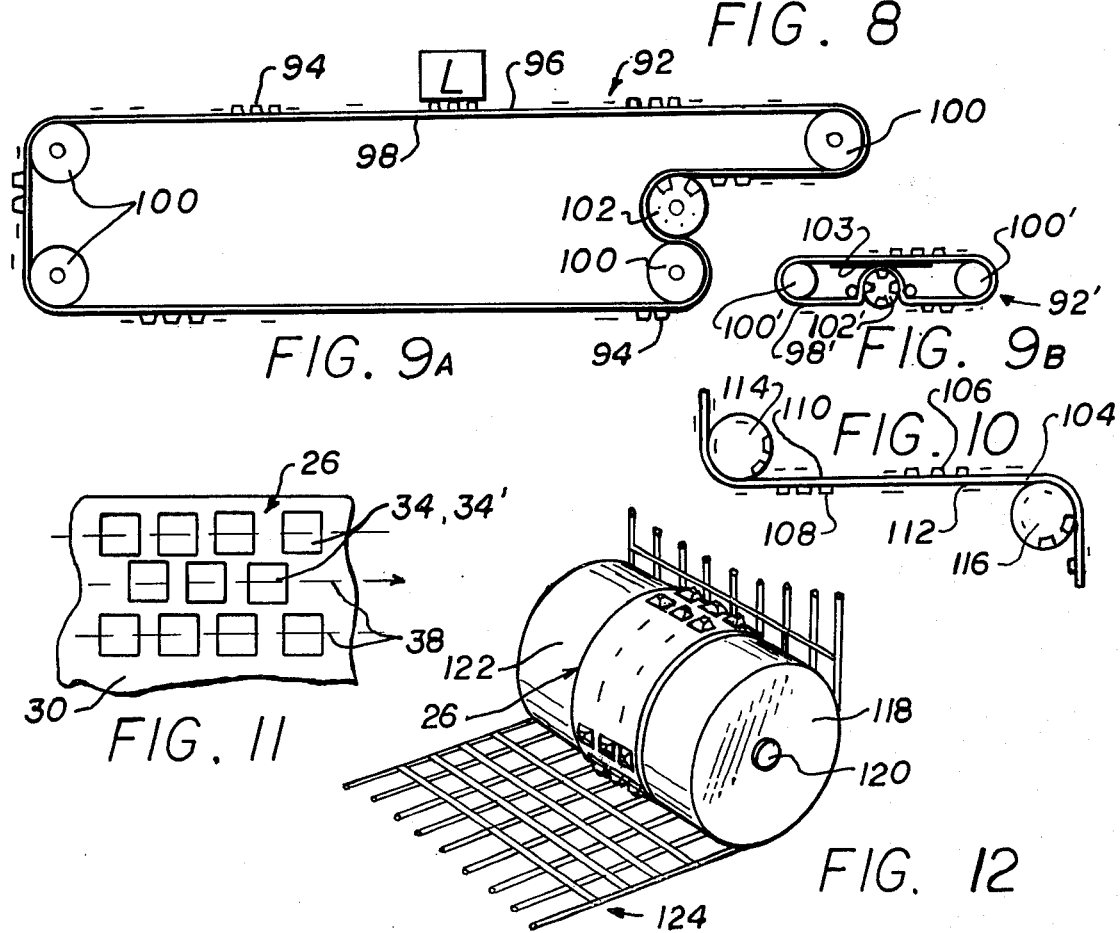

POSITIVE TRACKING PULLEY AND BELT CONSTRUCTION

BACKGROUND OF THE INVENTION

1. Field of the Invention

This invention relates generally to endless belt systems, particularly to a cog belt arrangement especially suited for positive tracking and positive drive applications.

2. Description of the Prior Art

My prior U.S. Pat. No. 4,011,939, issued Mar. 15, 1977, discloses a conveyor system including a drive pulley and a return pulley, either or both of which are of relatively large diameter and are provided with a plurality of cleat-receiving annular grooves. A conveyor belt provided with a plurality of longitudinal rows, or columns, of cleats, or projections, protruding from it engages the pulleys so that at least some of the columns engage with the grooves in the pulleys and assure good tracking of the belt. The projections are sized relative to the web of the conveyor belt such that the belt web itself normally does not contact the associated pulley. Interaction between the pulley grooves and the cleats provides drive force transmission from pulley to belt as well as providing a positive tracking, or belt alignment, even under severe off-center, or side load, conditions. At least some of the grooves can be inclined relative to a normal to the axis of rotation of the pulley and belt.

It also is known to provide cogs, or projections, on the inside surface of a drive belt in order to improve the flex of the belt and permit it to pass around pulleys of relatively small diameter.

SUMMARY OF THE INVENTION

It is an object of the present invention to provide a conveyor belt having a projection matrix permitting more uniform tracking, or side-load, distribution than known belts having pulley engaging projections.

It is another object of the present invention to provide a projection matrix endless belt that can be used with smooth as well as grooved pulleys of relatively small diameters.

It is still another object of the present invention to provide an endless belt which can be used in positive drive systems, and which facilitates both forward and reverse belt movement.

A still further object of the present invention is to provide a pulley and associated belt for a positive belt drive system which can be used for either timing or load carrying purposes, or both.

There and other objects are achieved according to the present invention by providing a conveyor belt apparatus comprising a planar web having a longitudinal extent and a pair of parallel surfaces. One of the surfaces is provided with a plurality of projections arranged in a plurality of rows and columns for forming a matrix engageable with an outer peripheral surface of a pulley associated with the belt. According to a preferred feature of the present invention, each of the projections is in the form of a truncated geometrical solid converging away from the web so as to maximize the possible amount of flex of the belt. Advantageously, a cylindrical portion extends from the truncated solid and away from the surface of the web for increasing the effective length of the projection.

Provision of a recess on the pulley for receiving the projections can permit the positive tracking of the web relative to the pulley, for which purpose circumferential grooves can be provided around the pulley, or permit a positive belt drive feature, for which purpose channels or sprockets can be provided on the pulley so as to extend parallel to the axis of rotation of the pulley, or permit both positive tracking and belt drive. The latter can be accomplished according to a particularly advantageous feature of the invention wherein the pulley is provided with a symmetrical matrix of sockets on the surface thereof, which matrix of sockets matches the matrix of projections on the belt web so that the sockets engagingly receive the projections contacting the pulley at any point in time. Alternatively, a combination of grooves and sprockets can be employed for both driving and tracking.

An advantage of the present invention is that it permits light-duty belts to be used with very small diameter pulleys.

Still another advantage of the invention is that a belt can be driven positively in either direction.

Another advantage of the present invention is that a single belt can be used for load carrying, including friction increasing functions, timing and positive drive purposes.

IN THE DRAWING

FIG. 1 is a schematic, perspective view showing an endless belt conveyor system constructed in accordance with the present invention;

FIG. 2 is a fragmentary, perspective view, partly in section, showing in enlarged detail one of the belt projections seen in FIG. 1;

FIG. 3 is a fragmentary, perspective view, partly in section, similar to FIG. 2 but showing an alternative embodiment of a projection according to the invention;

FIG. 4 is a fragmentary, diagrammatic, perspective view showing a positive belt drive conveyor arrangement according to the present invention;

FIG. 5 is a fragmentary, diagrammatic, perspective view showing a positive belt drive and tracking conveyor arrangement according to the invention;

FIG. 6 is a fragmentary, diagrammatic, perspective view showing an alternative embodiment of a tracking pulley according to the invention;

FIG. 7 is a fragmentary, sectional view taken generally along the line 7—7 of FIG. 6, but with the belt wrapped around the pulley;

FIG. 8 is a fragmentary, diagrammatic, side elevational view showing yet another pulley construction according to the invention;

FIGS. 9a and 9b are diagrammatic, side elevational views showing an alternative endless belt conveyor system constructed in accordance with the present invention;

FIG. 10 is a fragmentary, diagrammatic, side elevational view showing still another embodiment of an endless belt system constructed in accordance with the present invention;

FIG. 11 is a fragmentary, diagrammatic, plan view showing a modified belt according to the invention; and FIG. 12 is a fragmentary, diagrammatic, perspective view showing a positive mesh belt drive arrangement according to the present invention.

DETAILED DESCRIPTION OF THE PREFERRED EMBODIMENT

Referring now more particularly to FIGS. 1 and 2 of the drawings, an endless conveyor system 10 according to the present invention comprises a generally cylindrical head or drive pulley 12 and a return pulley 14, each including a respective shaft 16 and 18 defining an axis of rotation for the pulley 12, 14. The drive pulley 12 has an outer cylindrical surface 20 in which is provided a recessed arrangement 22 in the form of one or more circumferential grooves 24. An endless conveyor belt 26 including a planar web 28 is disposed extending around pulleys 12 and 14 for being driven by pulley 12. Web 28, which can be fabricated from polyvinyl chloride, urethane, rubber, and the like, has a pair of substantially parallel surfaces 30 and 32, of which surface 30 is shown as smooth for creating a load-carrying surface and surface 32 is provided with a plurality of projections 34 disposed in a plurality of rows 36 and columns 38 for forming a symmetrical matrix 40 of a rectangular grid. Surface 30, normally disposed for load-carrying, preferably is a layer 35 (FIG. 2) of polyester, and the like. The size of the projections 34, which are themselves symmetrical as to be described below, and the spacing between them is such as to permit projections 34 to positively engage in grooves 24 of pulley 12 and cause belt 12 to be kept in a central position on pulley 12 despite variations in side-loadings in the belt 26.

It is to be understood that pulley 14 can be provided with grooves (not shown) similar to grooves 24 in pulley 12 if so desired. Further, belt 26 can be used with smoothed surfaced pulleys (not shown) if desired, with projections 34 functioning as friction increasers in an advantageous manner. The latter is one of the advantages of the invention to be described in detail below. Each of the soft, long wearing projections 34, which can be constructed from a filled or nonfilled material (for example, carbon fibers) is in the form of a truncated geometric solid, in this case a truncated pyramid 42 having a polygonal base, converging away from surface 32 of web 28. More specifically, the four side walls of pyramid 42 converge from a larger, square, planar base 44 at surface 32 to a smaller, square, planar base 46 spaced from but substantially parallel to base 44 to form a frustom of a pyramid. This construction permits the projections 34 to pass around a pulley of relatively small diameter without interfering with one another.

A belt 26 according to the invention can be molded in a conventional manner, or can be formed as a flat belt and grooves and/or projections cut into an inner surface of the belt as by a cutting wheel (not shown). Once cut, the belt can be reversed if desired to place the projections on an outer surface of the belt.

Referring now to FIG. 3 of the drawings, an alternative embodiment of a projection according to the invention, designated 34', has a truncated pyramid 48 converging from a large base 50 to a smaller base 52, similar to pyramid 42, but a shorter distance between the square, planar bases 50, 52. Pyramid 48 is capped by a cylindrical portion 54 having a rounded tip 56 and arranged extending at an end 58 from base 52 and away from surface 32 of web 28 in order to permit greater penetration at a given cross-section area into a recess formed in an associated pulley by the projection 34'. The advantage of this embodiment, therefore, is the increased potential penetration, inasmuch as the length of the projections such as projection 34 is limited by the slope of the walls of pyramid 42 necessary to permit belt 26 to flex around a desired small diameter without projections 34 interfering with one another.

When made for tracking purposes only, the projections 34, 34' can be staggered from column to column so as to form a nonsymmetrical matrix (not shown).

One embodiment of a positive engagement drive arrangement according to the present invention is shown in FIG. 4 wherein a pulley 60 has a shaft 62 forming an axis of rotation and is provided with at least one, and preferably the illustrated plurality, of channels 64 arranged extending on an outer surface 66 of pulley 60 in directions substantially parallel to the axis of rotation of pulley 60 and to each other for engagingly receiving the projections 34, and forming positive drive means for advancing, forward or backward, the associated belt 26.

In addition to creating a more efficient belt drive, the arrangement shown in FIG. 4 will cause the belt 26 to move as a direct function of the angular velocity of rotation of pulley 60, making the system useful for timing functions. Alternatively, the pulley 60 can be a return or idler pulley and be driven as a function of the speed of the belt 26, making possible timing belt arrangements.

FIG. 5 of the drawing illustrates a pulley 68 rotatable about shaft 70 and provided with a symmetrical matrix 72 of sockets 74 in the outer surface thereof. The sockets 74 are arranged for engagingly receiving projections 34, 34' of a belt 26. By this arrangement, a belt 26 simultaneously can be positively trained, or tracked, and advanced by rotation of pulley 68 about the axis of rotation thereof. The size and spacing of the sockets 74 will be matched to the associated projections 34, 34' being used.

Also shown in FIG. 5 is a metal layer 75 disposed on surface 28 of belt 26. The layer 75, which can be bonded to belt 26 in a suitable known manner, can be, for example, a flexible sheet of steel or stainless steel of say, 0.010" to 0.040" thickness. This feature is particularly advantageous when using belt 26 to convey food (not shown) and the like, in which case the diameter of pulley 68 preferably is about 1" to each 0.001" thickness of layer 75 to assure a suitable slow belt speed.

Referring now to FIGS. 6 and 7, a pulley 76 is shown which is rotatable about a shaft 78 defining an axis of rotation and has a generally cylindrical outer surface 80 extending a predetermined length along the axis of rotation of pulley 76. A plurality of substantially parallel and coextensive annular rings 82 are provided on surface 40, the outer peripheries 84 of which rings 82 are contoured to fit between the projections 34, 34' provided on a belt 26 according to the invention. In this manner, the rings 82 form grooves for receiving the projections 34, 34' in such a manner as to cause positive tracking of the associated belt 26, with it being appreciated that the spaces between the rings 26 are recesses relative to the surface 32 of the belt 26.

FIG. 8 shows a positive drive and tracking arrangement according to the invention wherein a pulley 86 rotatable about an axle or shaft 88 is provided on the outer surface thereof with circumferentially arranged teeth 90 arranged forming a sprocket on the associated pulley 86. These teeth 90 engage with the projections 34 to positively drive an associated belt 26. While not specifically illustrated, it will be appreciated that teeth 34' could also be used with pulley 86. In addition, the sprocket teeth 90 can be disposed between the annular rings 82 as described above in conjunction with FIGS. 6 and 7 to permit positive tracking of the belt 26 as same as being driven by teeth 90. The latter are necessarily arranged in the area normally provided as a groove or recess for receiving the projections 34, 34'.

FIGS. 9a and 9b illustrate an alternative system 92, 92' according to the invention wherein cogs or projections 94, which can be in the form of projections 34, 34', for example, are provided on an outside surface 96 of a belt 98, 98', so as to function as a friction increaser for a load L disposed on belt 98, 98', and/or permit a positive drive and/or belt training arrangement wherein belt 98, 98' passes over idler pulleys 100, and projections 94 engage in grooves, channels, or sockets provided in a recessed drive pulley 102, 102' which can be similar to the pulleys described above. In this manner, a belt provided with cogs only on its outer surface can take advantage of the positive tracking/drive features of the invention.

Pulleys 100 can be very small, for example, only 1½" in diameter. Belt 98' is shown as supported on a top run thereof by a slide bed 102. Alternatively, a plurality of idler rollers (not shown) could be employed in place of bed 103. The arrangement of drive pulley 102' has the advantage of substantially 180° surface contact with the associated belt 98'.

Alternatively, a belt 104 as seen in FIG. 10 can be provided with projections 106, 108 on both of its planar surfaces 110, 112, respectively, so as to interengage with opposed pulleys 114, 116 arranged for guiding belt 104 along any desired path.

Provision of projections such as those designated 106 and 108 on each of the oppositely facing surfaces of a conveyor belt permits as well the use of the belt for both positive drive and/or tracking according to the invention, and for providing a friction increaser surface for a load in a manner similar to that of the embodiment illustrated in FIG. 9.

Further, as shown in FIG. 11, projections 34, 34' can be staggered in adjacent columns 38 to form a nonsymmetrical matrix for tracking purposes only.

FIG. 12 is a view similar to FIGS. 4 and 5, but showing how a pulley 118 rotatable about a shaft 120 can have a length of a belt 26 affixed to at least a central portion of the pulley surface 122 for driving and/or tracking a mesh belt 124. The amount of surface 122 covered by projections such as 34, 34' may vary as desired.

As can be readily understood from the above description and from the drawing, an endless conveyor system using belt projections formed and arranged according to the present invention permits positive belt training and/or belt/pulley advancement, including reversal, in a simple yet efficient manner. Further, the belt can be used for timing purposes as well as for transmission functions, since the positive advancement feature will cause a return or idler pulley provided with channels, teeth, or sockets to be rotated by the belt as a function of the angular rotation of the drive pulley of the system.

Most importantly, the belt tracking and/or driving system according to the present invention permits use of end pulleys of very small diameter down to one inch, for example, to be used while still obtaining a belt conformity about the pulley of substantially 180°. While the number of tracking grooves formed on a pulley either by recesses or raised rings can vary, it has been found satisfactory to provide such grooves across approximately one-third of the length of a pulley. Further, the present invention permits use of high friction carrying belts of load carrying ratings starting at, for example, 120 pounds per inch of width of the belt.

Although the present invention has been described above in terms of presently preferred embodiment, it is to be understood that such disclosure is by way of example only and is not intended to be considered as limiting. Accordingly, it is intended that the appended claims are to be interpreted as covering all alterations and modifications as fall within the true spirit and scope of the invention.

What is claimed is:

1. An endless belt apparatus comprising:
    an endless belt including a planar net having a longitudinal extent and a pair of parallel surfaces, a plurality of truncated pyramidal projections converging away from one of the surfaces of the web, each truncated pyramidal projection including one cylindrical portion extending from the truncated pyramid and away from one of the surfaces of the web, the truncated pyramidal projections arranged in a plurality of columns for forming a matrix; and
    a pulley having a cylindrical shape in combination with the belt, provided with a plurality of grooves circumferential of the cylindrical outer surface of the pulley and arranged for receiving columns of projections provided on one of the surfaces of the web with the belt and assuring proper tracking of the belt.

* * * * *